United States Patent [19]

Ampler

[11] 4,008,030
[45] Feb. 15, 1977

[54] DEVICE FOR MANUFACTURING BLOCKS OF POROUS THERMOPLASTIC IN A CONTINUOUS PROCESS

[75] Inventor: Leif Carl Gustaf Ampler, Vastra Frolunda, Sweden

[73] Assignee: Gullfiber AB, Billesholm, Sweden

[22] Filed: Sept. 22, 1975

[21] Appl. No.: 615,283

[30] Foreign Application Priority Data

Sept. 30, 1974 Sweden .......................... 7412287

[52] U.S. Cl. .............................. 425/224; 425/329; 425/371; 425/817 C
[51] Int. Cl.² ......................................... B29D 27/04
[58] Field of Search .............. 425/4 C, 817 C, 224, 425/115, 329, 371, 372, 89; 198/184; 271/197; 264/46.2, 46.3, 50, 52

[56] References Cited

UNITED STATES PATENTS

| | | | |
|---|---|---|---|
| 3,167,603 | 1/1965 | Lillie | 425/817 C X |
| 3,202,302 | 8/1965 | Insolio | 271/197 X |
| 3,885,009 | 5/1975 | Lahousse | 425/371 X |

*Primary Examiner*—Richard B. Lazarus
*Assistant Examiner*—Mark Rosenbaum

[57] ABSTRACT

Two, endless, perforated steel belts are mounted one above the other to travel about spaced rolls, and between a pair of spaced, parallel, stationary side walls, so that confronting portions of the belts form two sides of an elongate, rectangular channel. Granules of thermoplastic material are continuously fed into one end of the channel in a quantity sufficient to completely fill the channel. The moving belts convey the granules first past a heating zone, where steam is introduced through the perforated belts to cause the granules to expand, and then past a cooling zone, where the granules are sintered to form a solid, rectangular block which is discharged continuously from the opposite end of the channel and onto a surface where it is severed into individual blocks. The diameters of the holes in the belts range from 0.5 to 0.8 mm., and the number of holes ranges from 20,000 to 30,000 per square meter of belt.

2 Claims, 2 Drawing Figures

U.S. Patent  Feb. 15, 1977  4,008,030
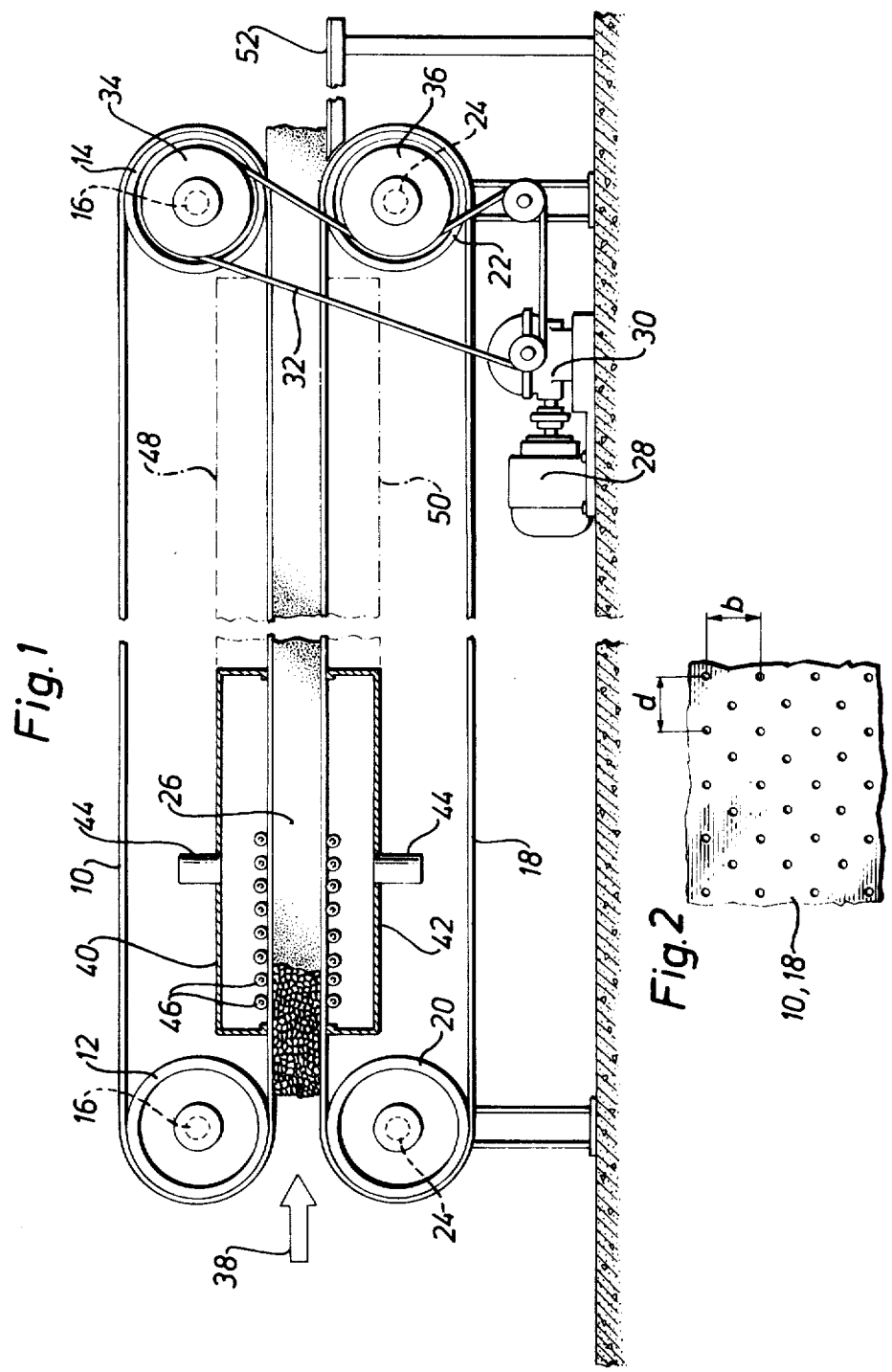

DEVICE FOR MANUFACTURING BLOCKS OF POROUS THERMOPLASTIC IN A CONTINUOUS PROCESS

The present invention relates to the production of porous, thermoplastic blocks, and more particularly to a device for manufacturing of a continuous block of porous, thermoplastic material by continuously supplying granules containing an expanding agent to one end of an elongated channel, which is open at both ends and bound on at least two sides by endless, perforated belts. Said channel has a heating zone within which the granules introduced into the channel are expanded, and during the expansion are sintered together and then conveyed through a cooling zone. The heating zone usually includes steam boxes which, via the perforations in said belts, communicate with the channel. The granules in the channel are heated by this steam to a temperature adapted to cause their final expansion. The portions of the belt facing the channel are positioned directly adjacent to the steam boxes. During the expansion, therefore, the mass of granules fills the cross-section of the channel and exerts a pressure on the belts which is taken up by support members usually having the shape of rolls, and disposed within the steam boxes.

The belts usually have a thickness of 1 - 1.2 mms, and since they are exposed to great stresses, are made of steel possessing great hardness. For various reasons, i.e. manufacturing-technical ones, the holes hitherto have been formed with a diameter between 1.5 - 2.5 mms and a mutual spacing of 9 and 20 mms in a quadrangular pattern. The number of holes per square meter ($m^2$) of the belts has been limited to between about 2,700 and 13,000. These individual holes have a many times smaller diameter than the average diameter of the pre-expanded granules. However, due to the wide range of diameters of the granules and chip fragments fed into the apparatus, plastic material penetrates through the belts into the feeding section of the apparatus, and into the steam sluice valves and steam boxes thereof, in spite of the prevailing steam pressure. This requires that the apparatus be stopped relatively often for cleaning the steam boxes and the support rolls provided therein in order that the belts not become worn out and/or damaged by depositions of plastic on the rolls.

It has been found that this drawback can be eliminated by reducing the diameter of the holes to less than 1 mm and preferably between about 0.5 and 0.8 mm. The reduction of hole size also permits the number of holes per $m^2$ to be increased, namely to 15,000 - 30,000 and more per $m^2$. This results at the same time the advantage that the steam is distributed more uniformly into the mass of expanding granules whereby a more homogeneous composition is imparted to the final product. The surface of the finished strand or block obtains a more favorable appearance due to the fact that its projecting lumps or burls, which are caused by the registering holes in the belts, disappear or become less perceptible.

The increased distribution of fine holes in the hard-steel belts has proved not to involve any weakening of the belts, as they can be formed by means of an electrode method known per se. According to this method a very great number of electrodes, each having the same diameter as the desired hole diameter and having the same mutual spacing as said holes, is mounted on a common holder so that in a single operation they can be passed through the belt while it is submerged in a liquid.

The invention shall hereinafter be described in more detail with reference to a specific embodiment thereof shown by way of example in the attached drawing where:

In FIG. 1, there is shown diagrammatically a side elevational view of apparatus for manufacturing a continuous block of porous thermoplastic in a continuous process, and In FIG. 2 there is shown an enlarged, fragmentary side elevational view of a portion of a belt that forms part of this apparatus.

In the drawing, 10 denotes an upper, endless belt which is disposed to travel about two rolls 12, 14 mounted to rotate on spaced, horizontal shafts 16, each of which has its ends mounted in bearings (not shown). A lower endless belt 18 is disposed to travel about rolls 20, 22 which are carried in the same manner by horizontal shafts 24. These belts are made of hard steel and suitably have a thickness of 1 - 1,2 mms. Furthermore, they are perforated. The total belt length may amount to 80 ms and the breadth is usually between 1,000 and 1,400 mms.

The portions of the belt facing one another form two sides of a rectangular, coherent channel 26, which is open at both ends. The other two sides of the channel may be defined by stationary, straight strips (not shown) in a manner known per se. The belts are driven by a common motor 28 through a reduction gear 30 and a driving belt 32, which runs about a pulley 34 on the shaft 16 which supports roll 14, and a pulley 36 on the shaft 24 which supports the lower roll 22.

The granular, usually pre-expanded plastic material is introduced into one end of the channel 26 as is indicated by arrow 38. This can in known manner be effected by conveyer screws or the like (not shown). At some distance from the rolls 12, 20, there is located a heating zone which comprises one or more steam boxes 40, 42 on each side of the portions of the belts 10, 18 facing one another. Steam is supplied to the steam boxes through pipes 44 and at a pressure of some tenths of one kp. The steam is discharged from the boxes and through the belts into the granular mass advanced within the channel 26 by the belts 10, 18; the granules of said mass thereby being expanded and sintered together. The belts are exposed to considerable pressure which is taken up by adjacent, transversely extending rolls 46 located inside the steam boxes.

Located down the channel 26 from the heating zone is a cooling zone, which, as is indicated in FIG. 1 by broken lines 48, 50, is formed on each side of the channel. This zone is supplied with a cooling agent so that the continuously sintered block is transformed into a solid state before it leaves the apparatus at the opposite end of the channel 26, where it is conveyed onto a table 52 to be severed into minor units.

As previously mentioned, the belts 10, 18 are perforated and the holes have a diameter which preferably amounts to about 0.5 - 0.8 mm. These are, according to FIG. 2, arranged in rows in the transverse and longitudinal directions of the belts so as to form a square pattern with the sides b and d, respectively, of each square having a length of 10 mms or thereabout. Furthermore, additional rows of holes are disposed so that each hole thereof is located centrally in each of the above-noted squares. The mutual spacing of all holes is thus equal. Other patterns for the perforations can be thought of, such as triangular. The spacing between the individual holes will, for example, be about 7 mms and 10 mms and ought to be kept within the limits of 5 – 12 mms. This implies that the number of holes per m$^2$ is about 20,000, with 15,000 as lower and 30,000 as approximately upper limit values.

Obviously, the invention is not limited to the illustrated embodiment, but may be varied in one or the other respect within the scope of the basic idea thereof.

Having thus described my invention, what I claim is:

1. A device for manufacturing a block of porous thermoplastic, comprising means defining an elongated channel open at both ends and through which granules containing an expanding agent are adapted to be fed continuously, said means including at least two, endless, perforated belts mounted to have confronting portions thereof travelling in the same direction and forming two sides of said channel, means adjacent one end of said channel defining a heating zone through which the granules introduced into the channel pass and are expanded, and means adjacent the opposite end of said channel defining a cooling zone through which the expanded particles pass and are sintered, said belts being made of steel and having therethrough a plurality of holes each having a diameter of less than 1 mm, and the number of holes per m$^2$ of each belt amounting to a minimum of 15,000.

2. A device for manufacturing a block of porous thermoplastic, comprising means defining an elongated channel open at both ends and through which granules containing an expanding agent are adapted to be fed continuously, said means including at least two, endless, perforated belts mounted to have confronting portions thereof travelling in the same direction and forming two sides of said channel, means adjacent one end of said channel defining a heating zone through which the granules introduced into the channel pass and are expanded, and means adjacent the opposite end of said channel defining a cooling zone through which the expanded particles pass and are sintered, said belts being made of steel and having therethrough a plurality of holes each having a diameter of less than 1 mm, and the spacing between two adjacent holes in a belt being less than 9 mms.

* * * * *